United States Patent [19]
de Gennes

[11] 3,933,227
[45] Jan. 20, 1976

[54] BRAKE HAVING A BRAKING MEMBER IN THE FORM OF A RING, ESPECIALLY FOR AUTOMOBILE VEHICLES

[75] Inventor: Gerard de Gennes, Senlis, France
[73] Assignee: Societe Anonyme Francaise du Ferodo, Paris, France
[22] Filed: Aug. 2, 1974
[21] Appl. No.: 494,298

[30] Foreign Application Priority Data
Aug. 17, 1973 France .............................. 73.30012

[52] U.S. Cl. ................. 188/76; 188/73.3; 188/73.5
[51] Int. Cl.² ......................................... F16D 53/00
[58] Field of Search ....... 188/73.3, 73.5, 73.6, 72.4, 188/76

[56] References Cited
UNITED STATES PATENTS

| | | | |
|---|---|---|---|
| 3,052,327 | 9/1962 | Yazell, Jr. et al. .................... | 188/76 |
| 3,260,332 | 7/1966 | Wells .................................... | 188/73.6 |
| 3,298,469 | 1/1967 | Robinette ........................ | 188/73.5 X |
| 3,368,647 | 2/1968 | Laverdant........................... | 188/73.3 |
| 3,612,224 | 10/1971 | Walther........................ | 188/73.3 X |
| 3,625,314 | 12/1971 | Rinker........................... | 188/73.5 X |
| 3,664,469 | 5/1972 | Maurice........................ | 188/73.5 X |

FOREIGN PATENTS OR APPLICATIONS

| | | | |
|---|---|---|---|
| 2,020,684 | 11/1971 | Germany ........................... | 188/73.5 |

*Primary Examiner*—George E. A. Halvosa
*Attorney, Agent, or Firm*—Young & Thompson

[57] ABSTRACT

Brakes for automobile vehicles for example, of the kind comprising a fixed support, a braking member having a ring, two braking plates disposed on each side of the ring and a floating stirrup engaged on the plates and on the ring. The stirrup has operating means adapted to act directly on one of the plates and indirectly on the other, through the intermediary of the stirrup, so as to grip and brake the ring. The stirrup is mounted with a simultaneous sliding and pivoting action of the fixed support, so as to follow any possible conical deformation of the ring on which it is engaged, due to heat stresses for example. The rear transverse face of the stirrup is in simple supporting contact with a retaining member secured to the fixed support, and which permits the sliding and pivotal movements of the stirrup, an elastic spring being provided to urge the stirrup and the retaining member into contact with each other.

The retaining member may be pivotally mounted on the fixed support and thereby provides the pivotal movement of the stirrup.

31 Claims, 14 Drawing Figures

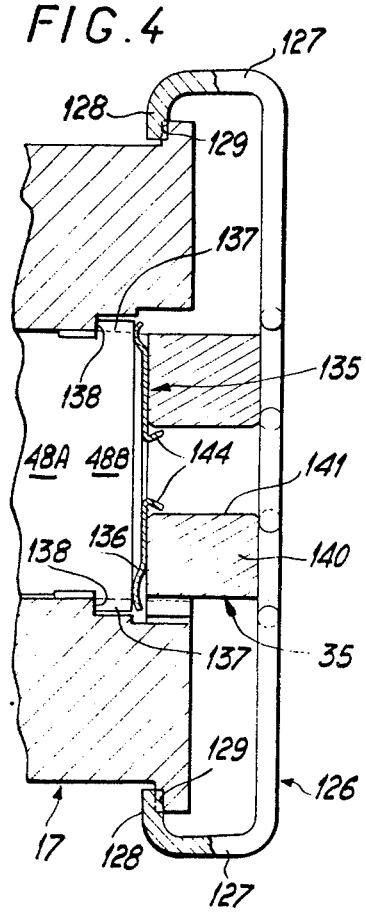
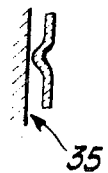
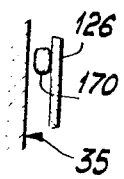

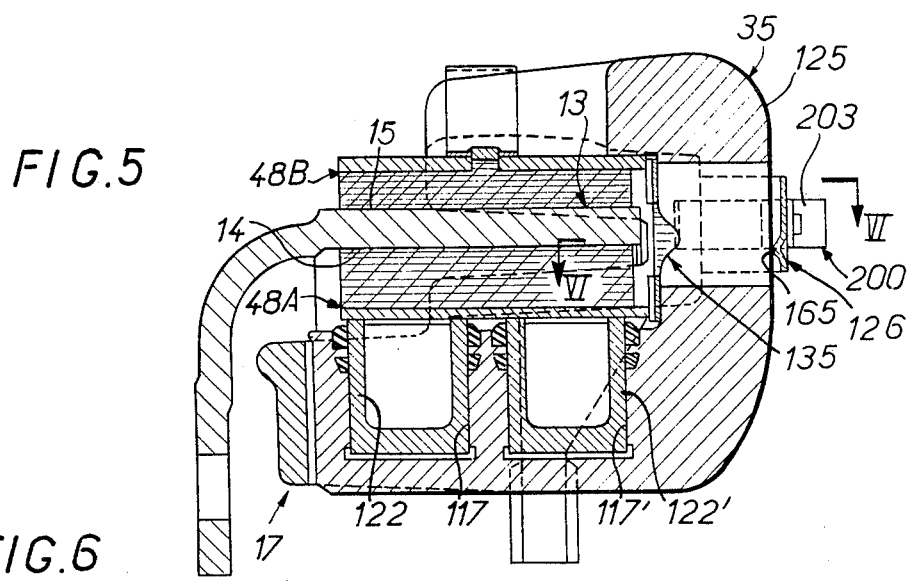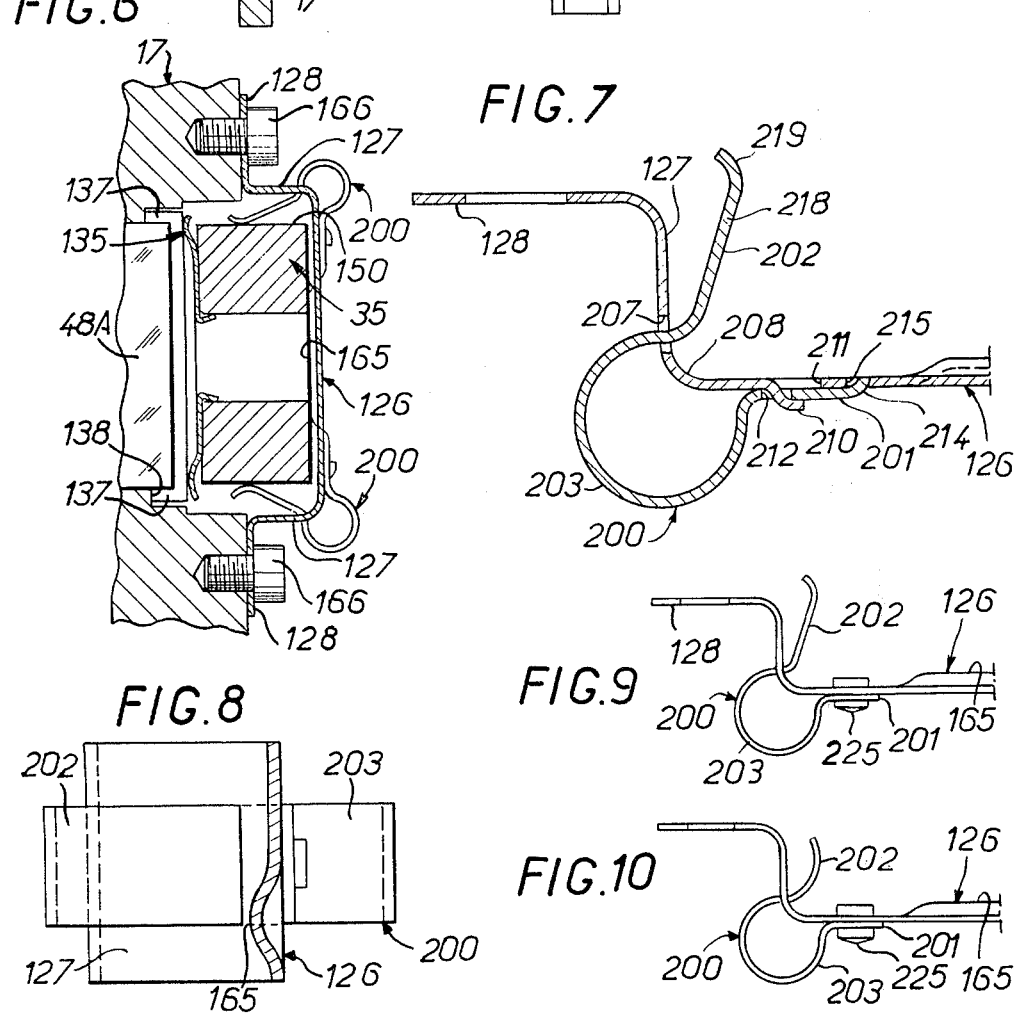

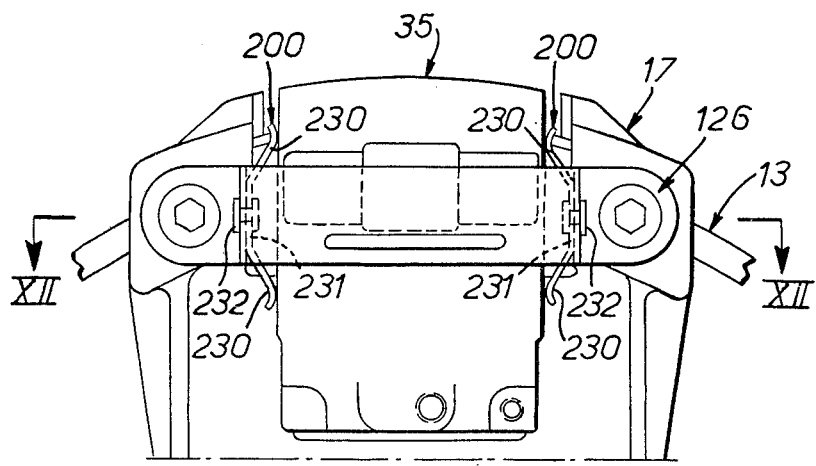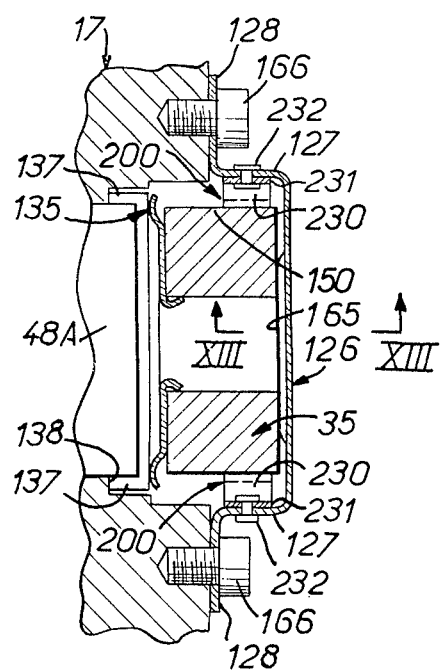

3,933,227

BRAKE HAVING A BRAKING MEMBER IN THE FORM OF A RING, ESPECIALLY FOR AUTOMOBILE VEHICLES

The present invention is concerned generally with brakes which are intended for example to be fitted on automobile vehicles and comprise a fixed support, a member to be braked having a ring, two braking plates arranged on each side of the said ring, and a floating stirrup engaged on the said plates and on the said ring, the said stirrup containing an operating means adapted to act directly on one of the said plates and indirectly on the other through the intermediary of the stirrup, for gripping the ring, and is more particularly directed to such of these brakes in which the said stirrup is mounted simultaneously slidably and pivotably on the fixed support.

This sliding and pivotal mounting of the stirrup advantageously permits this latter to follow any possible deformation into a cone of the ring on which it is engaged, due for example to the thermal stresses to which this ring is subjected.

The present invention has for its object the provision of an improvement in brakes of this type.

According to this improvement, the stirrup, by its rear transverse face, that is to say by its tranverse face farthest away from the edge of the ring, is in simple supporting contact with a retention member which is fast on the fixed support and which is able to permit the sliding and pivotal movement of the stirrup, elastic means being provided so as to urge the said stirrup and the said retention member into contact with each other.

This arrangement generally results in advantageously simple constructions.

In addition, it can advantageously lead to constructions in which the stirrup is pivotally mounted about an axis located in a plane which is perpendicular to the axis of the ring and which, from the rear transverse face of the stirrup, and in the direction of the edge of the ring, is in front of said rear transverse face of the stirrup.

The result is that the real pivotal axis of the stirrup can be brought close to the ideal theoretical pivotal axis corresponding to the opening into a cone of the ring on which this stirrup is engaged.

The characteristic features and advantages of the invention will furthermore be brought out in the description which follows below, given by way of example, reference being made to the accompanying drawings, in which:

FIG. 4 is a partial diagrammatic view in circumferential section of the brake according to the invention, taken along the line IV—IV of FIG. 2, this cross-section being assumed to be developed on the flat;

FIG. 5 is a view in axial section of an alternative form of construction of the brake according to the invention;

FIG. 6 is a view in partial cross-section taken along the broken line VI—VI of FIG. 5;

FIG. 7 is a view in partial longitudinal section of the retaining member provided on such a brake;

FIG. 8 is a view in transverse section of this retaining member;

FIG. 9 is a partial view in elevation of an alternative form of construction of a retaining member of this kind;

FIG. 10 is a view similar to FIG. 9 and relates to another alternative form of construction;

FIG. 11 is a view in elevation of another alternative form of construction of the brake according to the invention;

FIG. 12 is a view in cross-section of this alternative form, taken along the line XII—XII of FIG. 11;

FIG. 13 is a partial view in cross-section taken along the line XIII—XIII of FIG. 12; and FIG. 14 is a view similar to FIG. 13 but relates to an alternative form of construction.

Figure 1:
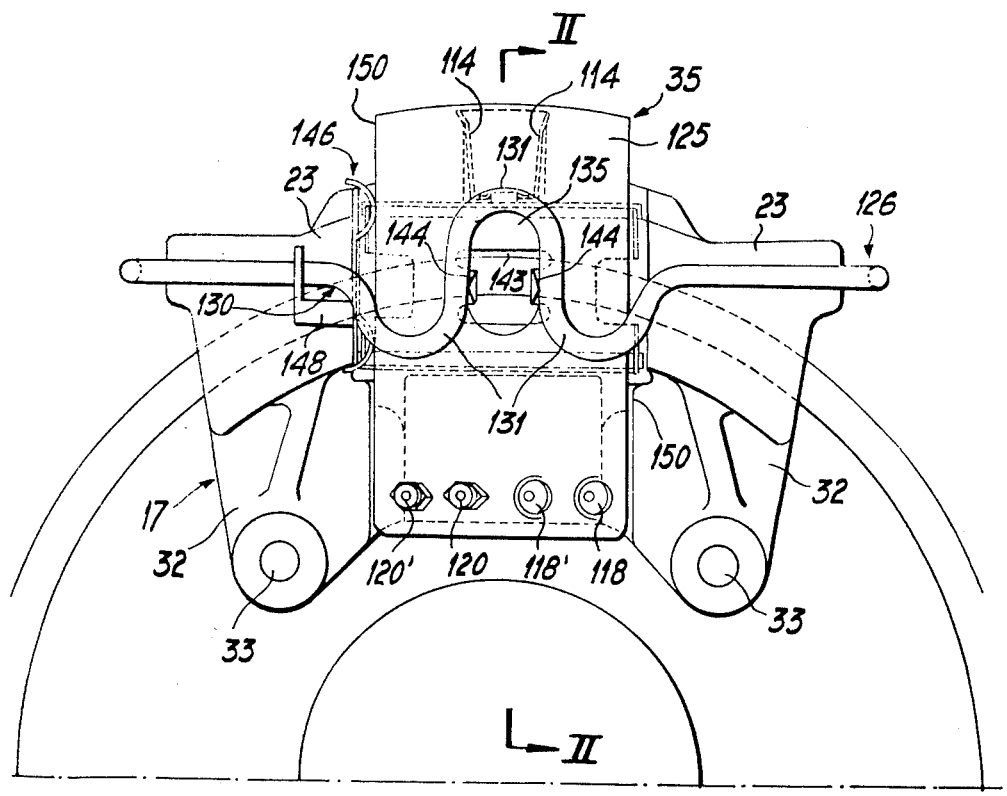
FIG. 1 is a view in elevation of a brake according to the invention.

Generally speaking, the brake according to the invention comprises a member 11 to be braked, having the general shape of a bowl, the bottom of which has an opening 12 for the passage of the stub-axle of a wheel to be braked, and which is intended to be fixed by this bottom to the rim of a wheel of this kind.

The free edge of this bowl forms a ring 13 having an internal track 14 and an external track 15.

With this ring 13 is associated a clamping means which comprises a fixed support 17 having the general shape of an H.

This support 17 comprises a curved central rod 22.

On one side of this central rod 22, the legs 23 of the fixed support 17 are in the form of hooks and embrace the free edge of the ring 13 of the member 11 to be braked.

On the other side of the central rod 22, the support 17 comprises legs 32 pierced with passages 33 for the fixing of a supporting member (not shown) forming part of the stub-axle of the wheel to be braked.

With the fixed support 17 there is associated a stirrup 35 in the shape of a C.

This stirrup embraces the free edge of the ring 13 of the member 11 to be braked, between the legs 23 and 32 of the fixed support 17, and on each side of two braking plates 48A, 48B, the first of which is associated with the internal track 14 of the ring 13, while the second is associated with the external track 15 of this ring.

The arm 100 of the stirrup 35 which is on the radially outer side of the ring 13 is provided in the example shown with a notch 105 which opens at its free extremity.

The shoe 48B is coupled to the stirrup 35.

This arrangement makes it possible to avoid a continuously interrupted contact between the ring and this braking plate apart from the clamping action applied on this ring, and thereby avoids untimely wear of this braking plate and a useless heating of this ring.

In the example shown, the coupling between the braking plate 48B and the stirrup 35 is effected with the aid of elastic means, and more precisely by a spring blade 110 bent into the shape of a U. The central portion of this spring blade has an opening 111 for engagement on a stud 112 formed for that purpose on the supporting plate which carries the brake lining of the braking plate 48B, a circlip 113 ensuring the safety of this engagement, and the wings 114 of this spring blade 110 are in contact with the sides of the notch 105 of the arm 100 of the stirrup 35, until at their extremity they take the shape of the corresponding edges of this notch.

The arm 116 of the stirrup 35 which is radially inside the ring 13 is cut-out into two cylinder chambers 117, 117', the axes of which are located in planes perpendicular to the axis of the ring 13 and are spaced apart axially along this axis.

These cylinder chambers 117, 117' are each capable of being connected independently to separate operating circuits by means of nozzles 118, 118' which communicate with the chambers 117, 117' by conduits 119, 119'.

Drainage nozzles 120, 120' are also provided, which are respectively associated with the cylinder chambers 117, 117'.

In the cylinder chambres 117, 117' are slidably mounted pistons 122, 122', each intended to act on the braking plate 48A.

This arrangement thus permits the operation of the brake by means of one or the other of two control circuits which are independent of each other.

It has of course already been proposed to ensure such a double control by means of independent cylinder-piston assemblies, but in constructions of this type which are known at the present time, the axes of these cylinder-piston assemblies are both contained in a single plane perpendicular to the axis of the ring, these cylinder-piston assemblies being thus staggered circumferentially around the axis of the ring.

In accordance with the arrangement described above, the corresponding cylinder-piston assemblies are staggered axially along the axis of the ring, which advantageously enables the circumferential size of the fixed support to be reduced and thereby facilitates the installation of the brake.

By its rear transverse face 125, that is to say by that of its transverse faces which is the farthest away from the edge of the ring 13, the stirrup 35 is, according to the invention, in simple supporting contact with a retaining member 126 which is secured to the fixed support 17 and which is intended to permit the sliding and pivotal movement of this stirrup.

According to the form of construction illustrated in FIGS. 1 to 4, the retaining member 126 is pivotally mounted on the fixed support 17.

This retaining member has the general shape of a U and the extremities of its arms 127 are provided with substantially square returns 128 preferably directed towards each other for pivotal engagement in recesses of generally gutter shape 129, formed for that purpose on the arms 23 of the fixed support 17, perpendicular to the axis of the ring 13.

In the example shown in FIGS. 1 to 4, the retaining member 126 is of round wire suitably shaped, and its central portion 130 is provided with corrugations 131 in order to increase its supporting surface with respect to the stirrup 35.

In addition, elastic means are provided which urge the stirrup 35 and the retaining member 125 into contact with each other.

In the example of construction illustrated by FIGS. 1 to 4, these elastic means are constituted by a spring 135 interposed between the stirrup and the fixed support 17, the said spring 135 being supported against the fixed support 17 through the intermediary of the braking plates 48A, 48B.

In practice and as shown, the supporting plates carrying the brake linings of the braking plates 48A, 48B are provided laterally and on each side, facing the front transverse face 136 of the stirrup 35 with lugs 137 intended to come into abutment against shoulders 138 of the fixed support 17, and the spring 135 is inserted between these lugs and the front transverse face 136 of the stirrup 35.

The spring 135 has the general shape of an H, the central portion of which bears against the front transverse face 136 of the stirrup 35, and the legs of which bear at their extremities on the braking plates 48A, 48B.

In the example shown, the central portion 140 of the stirrup 35 has an opening 141, and the central portion of the spring 135 has an opening 143 by means of which there are formed two lugs 144, the extremities of which are supported against the flanks of the opening 141 of the stirrup 35 in order to retain the spring 135.

With the stirrup 35 there are also associated elastic stabilization means provided between this stirrup and the fixed support 17 in order to oppose a possible undesirable sliding movement of the said stirrup.

These elastic stabilization means act on one of the lateral faces 150 of the stirrup 35, that is to say on a face of the stirrup which is substantially perpendicular to its transverse rear face 125.

In the example shown in FIGS. 1 to 4, these elastic stabilization means comprise a spring blade 146 inserted longitudinally between a lateral face 150 of the stirrup 35 and the corresponding leg 23 of the fixed support 17, this spring blade 146 having a central portion in contact with the said leg and two corrugated extremities in contact with the said lateral face 150 of the stirrup 35.

For its retention, the spring blade 146 is provided, in the examples shown in FIGS. 1 to 4, with a lateral hooking lug 148 engaged on the retaining member 126.

As will be readily understood, the inlet of fluid under pressure to either one of the cylinder chambers 117, 117' enables the corresponding piston 122, 122' to act directly on the braking plate 48A for the application of this latter against the internal track 14 of the ring 13, and indirectly on the braking plate 48B through the intermediary of the stirrup 35, for the application of this braking plate 48B against the external track 15 of the ring 13.

This ring 13 is thus gripped by the braking plates 48A, 48B, and is thus braked, if desired, until it stops.

When the pressure of fluid is released, the ring 13 is freed.

Figure 2:
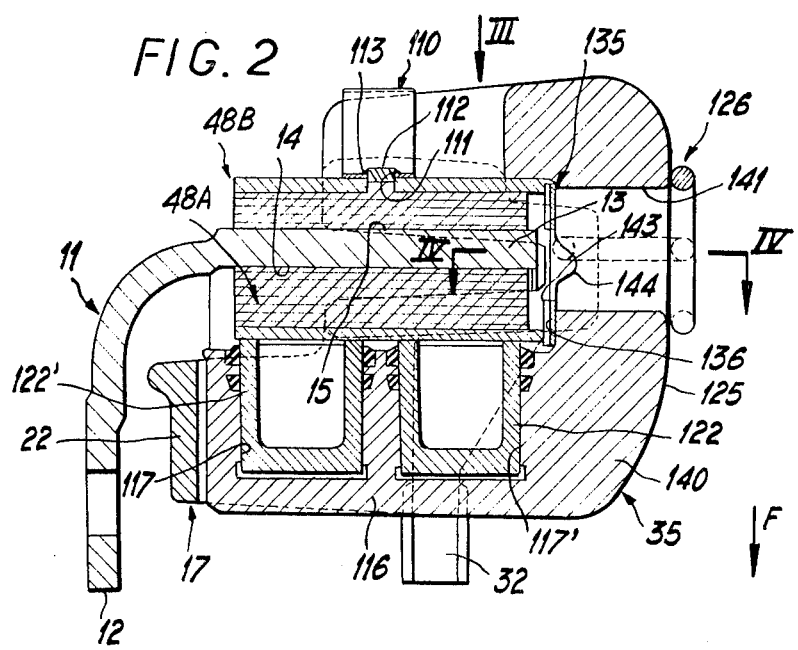
FIG. 2 is a view of this brake in axial section, taken along the line II—II of FIG. 1.

During such a braking action, the stirrup 35 must move by sliding perpendicularly to the axis of the ring 13, following the arrow F of FIG. 2.

This sliding action is permitted by a corresponding pivotal movement of the retaining member 126 against which the stirrup 35 is supported.

The pivotal movement of this retaining member 126 also permits the stirrup 35 to follow a possible deformation to a cone of the ring 13.

Figure 3:
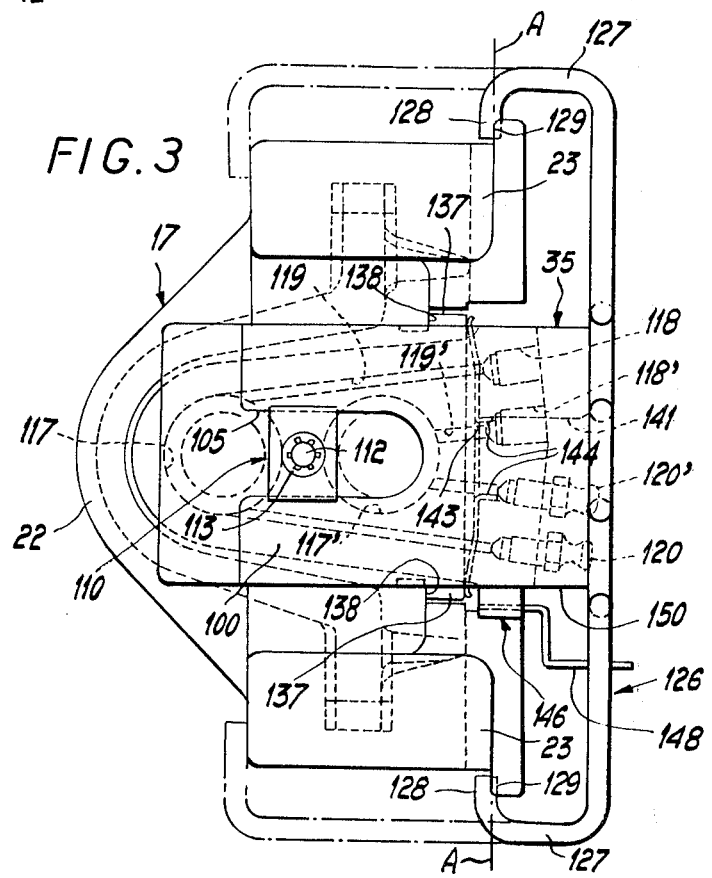
FIG. 3 is a view of the brake in plan taken along the arrow III of FIG. 2, the ring to be braked being assumed to be removed.

As will have been noted, this pivotal movement of the retaining member 126 is carried out around an axis AA, FIG. 3, which in the example shown in FIGS. 1 to 4, corresponds to the axis of the square return portions 128 of this retaining member 126, and this axis AA is advantageously in front of the rear face 125 of the stirrup 35 in the direction of the edge of the ring 13.

By extending the sides 127 of the retaining member 126, as shown in chain-dotted lines in FIG. 3, this axis AA could furthermore be located well beyond the edge of the ring 13, this latter having only been mentioned above in order to define the sense of the direction along which this axis AA is displaced with respect to the rear transverse face of the stirrup.

The result is that the pivotal movement of the stirrup 35 is effected about an axis which is advantageously closer to the ideal theoretical axis corresponding to the conical formation of the ring 13, this ideal theoretical axis being obviously located beyond the bottom 12 of the braking member 11 which carries this ring 13.

According to the alternative forms of construction illustrated in FIGS. 5 to 12, the retaining member 126 is rigidly fixed to the fixed support 17.

In the forms of construction shown, this retaining member 126 is constituted by a blade, of metal for example, suitably shaped, and has the general overall shape of a U.

The extremities of its arms 127 are provided with return portions 128 substantially at right angles and directed outwards in opposite directions to each other, and which each form a lug permitting the fixing of the retaining member 126 on the fixed support 17, this fixing being effected by means of screws 166 in the example shown.

In its central portion, the retaining member 126 is provided, in contact with the rear transverse face 125 of the stirrup 35, with a pivotal edge 165 which in the example shown is formed by an appropriate deformation of the said central portion of the retaining member 126.

In the example shown, this pivotal edge 165 is continuous, but it is obvious that it could be divided into two or more sections aligned perpendicularly with the axis of the ring.

It will be noted that, in the example shown, this pivotal edge extends at a distance from the longitudinal axis of the central portion of the retaining member 126, that is to say it is closer to one of the edges of this central portion than to the other, parallel to this edge. This arrangement makes it possible to take into account that the spring 135 bears by its extremities on the shoes 48A, 48B and that since the shoes are curved, the barycentre of the corresponding supporting zones of the said extremities is radially displaced towards the axis of the ring 13 with respect to the central zone of the spring.

The elastic stabilization means provided between the stirrup 35 and the fixed support 17 for action on the lateral faces 150 of this stirrup comprise, for each of the said transverse faces 150 of the stirrup 35, an elastic member 200 separate from the retaining member 126 and permanently fixed on this latter.

This arrangement advantageously facilitates the assembly of the brake and permits easier proportioning of the stabilizing clamping force applied to its stirrup.

In accordance with the form of embodiment shown in FIGS. 5 to 10, this elastic member 200 comprises two wings 201, 202 coupled together by a central torsion portion 203 which, in the example shown, has a contour extending substantially along three-quarters of a circle, the wings 201, 202 moving away from each other in the form of a V from their coupling zone to the central torsion portion 203 which joins them together.

This elastic member may be constituted for example also by a blade as shown, and for example a metal blade, suitably shaped.

However this may be, it is permanently fixed to the retaining member 126 by one of its wings, in practice the wing 201 for the example shown, while the other wing, the wing 202 in the example shown, remains free.

The wing 201 of an elastic member 200 by which it is permanently fixed to the retaining member 126, is applied against one of the faces of the retaining member 126, while its free wing 202 projects from the other face of this retention member, after passing through an opening 207 formed for that purpose in this face.

In practice in the example shown, an elastic member 200 is fixed by its wing 201 to the central portion of the retaining member 126, on the convex side of this latter, while its central torsion portion 203 is facing the curved coupling zone 208 connecting the central portion of the retaining member 126 to the corresponding wing 127 of this retaining member, and the opening 207 through which its free wing 202 passes is formed in the wing 127 of the said retaining member.

In the example shown in FIGS. 5 to 7, the permanent fixing of an elastic member 200 on the retaining member 126 is effected by complementary engagement means provided for that purpose between these two members.

In the example shown, these complementary engagement means comprise a tongue 210 which is formed in the central portion of the retaining member 126, by means of an opening 211 formed in this latter, and which is bent back at its extremity parallel to the said central portion, and this tongue 210 is engaged in an opening 212 formed for that purpose in the wing 201 of the elastic member 200.

At the same time, the extremity 214 of the wing 201 of the elastic member 200 is bent back in turn, overall to a quater-circle, for engagement in an opening 215 formed for that purpose in the central portion of the retaining member 126.

As will be readily understood, these complementary engagement means ensure in an effective manner a permanent fixing of an elastic member 200 on the retaining member 126, which enables the whole of the retaining member 126 and the elastic members which are associated therewith to form conjointly a unit capable of being handled separately without risk of coming apart.

The distribution between the members concerned of the tongues which constitute these complementary engagement means could of course be reversed, the tongue 210 being formed on the elastic member 200, and another tongue playing the part of the bent back extremity 214 of the wing 201 of the elastic member 200 being provided on the retaining member 126. Furthermore, in the example shown in FIGS. 5 to 7, the free wing 202 of an elastic member 200 comprises a rectilinear section 218 terminated by a bent back extremity 215 with its concavity turned towards the corresponding wing 127 of the retaining member 126.

The operation of this alternative form is similar to that described above.

In operation, the stirrup 35 slides in contact with the pivotal edge 165 of the retaining member 126.

In addition, a pivotal movement of the stirrup 35 about the pivotal edge 165 of the retaining member 126 with which it is in contact is possible, and such a pivotal movement enables this stirrup 35 to follow a possible conical deformation of the ring 13.

During the course of these pivotal and/or sliding movements, the spring 135 ensures the maintenance of the stirrup 35 in contact with the pivotal edge 165 of the retaining member 126, and the elastic members 200 carried by this latter ensure suitable lateral stabilization of this stirrup with respect to the fixed support 17, these elastic members 200 being fixed on the retaining member 126 which is in turn coupled to the fixed support 17.

In accordance with the alternative forms of construction illustrated by FIGS. 9 and 10, the fixing of an elastic member 200 to the retaining member 126 is effected by means of a rivet 225 fixing the wing 201 of the said elastic member to the central portion of the said retaining member.

According to the form of construction illustrated by FIG. 9, the form of the free wing 202 of an elastic member 200 is identical to that described with reference to FIGS. 5 to 8.

As an alternative, see FIG. 10, such a free wing 202 is generally curved.

According to the alternative form of construction shown in FIGS. 11 and 12, an elastic member 200 extends overall transversely with respect to the retaining member 126 which carries it, and comprises two free supporting wings 230 connected together by a central fixing portion 231, the said wings moving farther away from each other as they leave the said central portion.

By its central fixing portion 231, it is permanently fixed to the corresponding wing 127 of the retaining member, for example by a rivet 232. In the example shown, this fixing is effected on the convex face of the retaining member 126, that is to say on the outer face of this latter, but this fixing could equally well be effected on the concave face of the said retaining member.

By each of its wings 231, the elastic member is supported against the stirrup 35, and preferably, as shown, the extremity of this wing is curved back for each purpose.

Such an elastic member thus advantageously has two supporting zones in contact with the stirrup, and in addition it extends in the direction of sliding of the stirrup.

According to the alternative form of construction shown in FIG. 14, the pivotal edge of the retaining member 126 is formed by a bead 170 added on to this member.

In accordance with various alternative forms of construction (not shown) the elastic stabilization means associated with the retaining member for lateral stabilization of the stirrup are constituted by an appropriate deformation of the wings of the said retaining member and/or the elastic means also associated with the retaining member for keeping the stirrup in contact with this member may result from the fact that the retaining member 126 itself forms an elastic member, this alternative being applicable to any of the forms of embodiment described above.

It will of course be understood that the present invention is not limited to the forms of embodiment described and shown, but includes any alternative form of construction and/or combination of their various parts.

What I claim is:

1. A spot type ring brake comprising a fixed support, a member to be braked having a normally generally cylindrical ring, one brake pad arranged for frictional engagement with the radially inner face of said ring and another brake pad arranged for frictional engagement with the radially outer face of said ring, a stirrup member straddling the brake pads and having legs extending respectively inside and outside said ring and a bight portion interconnecting said legs and opposite the free outer edge of said ring, operating means housed in said stirrup member and acting directly on one of said brake pads, a retaining member mounting the stirrup member for sliding movement for indirectly transmitting force to said other brake pad as well as for pivotal movement of only one fixed radius about only one fixed axis for compensating for eventual conical deformation of said ring so that said stirrup member substantially stays with said ring even when the latter becomes conically deformed with use, said retaining member having a central portion closely overlying the surface of the bight portion of said stirrup remote from the free outer edge of said ring and in simple supporting contact therewith, said retaining member having two lateral branches securing it to said fixed support, said retaining member having a fulcrum thereon that positions said stirrup for said pivotal movement of fixed radius about said fixed axis that is perpendicular to the axis of the ring and substantially tangential to the cylinder of the ring, the ends of said fulcrum being spaced apart a substantial distance along said fixed axis, and resilient means axially urging said stirrup member away from said ring and urging said bight portion of the stirrup member against the central portion of said retaining member overlying the same.

2. A brake as claimed in claim 1, in which said retaining member is pivotally mounted on said fixed support and thus permits the pivotal movement of said stirrup.

3. A brake as claimed in claim 2, in which said retaining member is generally of U-shape and the extremities of its wings are provided with turned-back portions for pivotal engagement in recesses formed for that purpose in said fixed support, perpendicular to the axis of said ring.

4. A brake as claimed in claim 3, in which said retaining member is of round wire.

5. A brake as claimed in claim 4, in which the central portion of said U-shaped member is provided with corrugations.

6. A brake as claimed in claim 1, in which said fixed axis, in the direction of the edge of said ring, is in front of said surface of the bight portion of said stirrup.

7. A brake as claimed in claim 1, in which said retaining member is provided with a pivotal edge in contact with said stirrup, said pivotal edge comprising said fulcrum.

8. A brake as claimed in claim 7, in which said pivotal edge is formed by an appropriate deformation of said retaining member.

9. A brake as claimed in claim 7, in which said pivotal edge is formed by a bead added on said retaining member.

10. A brake as claimed in claim 1, in which said resilient means comprise a spring interposed between said stirrup and said fixed support.

11. A brake as claimed in claim 10, in which said spring is supported against said fixed support through the intermediary of at least one of said braking plates.

12. A brake as claimed in claim 1, and further comprising elastic stabilization means provided between said stirrup and said fixed support and adapted to act on a lateral face of said stirrup, namely on a face of said stirrup substantially perpendicular to its transverse rear face.

13. A brake as claimed in claim 12, in which said elastic stabilization means comprise at least one spring blade inserted between said stirrup and said fixed support.

14. A brake as claimed in claim 12, in which the elastic member which is permanently fixed to said retaining member comprises two free supporting wings connected by a central fixing portion, said wings being progressively further apart from said central fixing portion, and said elastic member being fixed to said retaining member by its central fixing portion.

15. A brake as claimed in claim 14, in which said elastic member extends overall transversely with respect to said retaining member.

16. A brake as claimed in claim 14, in which said retaining member has a general overall shape of a U, and said elastic member is fixed to one of the wings of said retaining member.

17. A brake as claimed in claim 14, in which the extremities of the free supporting wings of said retaining member are bent back.

18. A brake as claimed in claim 14, in which said elastic member is constituted by an appropriately-shaped blade.

19. A brake as claimed in claim 12, in which said elastic stabilization means comprise an elastic member separate from the retaining member and permanently fixed to said latter member.

20. A brake as claimed in claim 19, in which said elastic member is permanently fixed to said retaining member by a rivet.

21. A brake as claimed in claim 19, in which said retaining member carries two elastic members for cooperation respectively with each of the lateral faces of said stirrup.

22. A brake as claimed in claim 19, in which the elastic member which is permanently fixed to said retaining member comprises two wings coupled together by a central torsion portion, said elastic member being fixed to said retaining member by one of its wings, while the other wing remains free.

23. A brake as claimed in claim 22, in which the central torsion portion of said elastic member has a contour extending substantially over three-quarters of a circle, and the wings of which move farther away from each other from their coupling zone to said central portion.

24. A brake as claimed in claim 22, in which the free wing of said elastic member comprises a rectilinear section terminating in a bent-back extremity.

25. A brake as claimed in claim 22, in which the free wing of said elastic member is curved overall.

26. A brake as claimed in claim 22, in which said retaining member is constituted by a suitably-shaped blade, the wing of the elastic member by which the latter is permanently fixed thereto is applied on one of the faces of said blade, while the free wing of said elastic member projects from the other face of said blade, after passing through an opening formed for that purpose in said blade.

27. A brake as claimed in claim 26, in which said elastic member is itself constituted by a suitably-shaped blade.

28. A brake as claimed in claim 22, in which said retaining member has the general shape of a U, the central torsion portion of the elastic member which is permanently fixed on the retaining member is facing the curved coupling zone connecting a wing of said retaining member to the central portion of said member, on the convex side of the retaining member.

29. A brake as claimed in claim 28, in which complementary engagement means are provided between said retaining member and the wing of said elastic member by which the latter is permanently fixed to said retaining member 30. A brake as claimed in claim 29, in which said complementary engagement means comprise a tongue formed in either said retaining member or said elastic member and bent back at its extremity parallel to said member, said tongue being engaged in an opening formed for that purpose in the other said member.

31. A brake as claimed in claim 30, in which said tongue is formed on said retaining member and the extremity of the corresponding wing of said elastic member is itself bent back for engagement in an opening formed for that purpose in said retaining member.

* * * * *